US010417296B1

(12) United States Patent
Matsuoka (10) Patent No.: US 10,417,296 B1
(45) Date of Patent: Sep. 17, 2019

(54) INTELLIGENT BOOKMARKING WITH URL MODIFICATION (75) Inventor: Yoshimichi Matsuoka, Cupertino, CA (US)

(73) Assignee: Google LLC, Mountain View, CA (US)

(*) Notice: Subject to any disclaimer, the term of this patent is extended or adjusted under 35 U.S.C. 154(b) by 465 days.

(21) Appl. No.: 13/408,923

(22) Filed: Feb. 29, 2012

(51) Int. Cl.
*G06F 16/955* (2019.01)
*G06F 17/24* (2006.01)

(52) U.S. Cl.
CPC ...... *G06F 16/9562* (2019.01); *G06F 16/9566* (2019.01); *G06F 17/24* (2013.01)

(58) Field of Classification Search
CPC ............. G06F 2201/86; G06F 17/2288; G06F 17/30884; G06F 17/30716; G06F 17/241; G06F 17/22; G06F 16/9562; G06F 16/9566; G06F 17/24
USPC ................................................... 715/206, 208
See application file for complete search history.

(56) References Cited

U.S. PATENT DOCUMENTS

| 5,813,007 | A * | 9/1998 | Nielsen | G06F 17/30884 |
| 6,041,360 | A * | 3/2000 | Himmel | G06F 17/30884 707/999.001 |
| 6,195,707 | B1 * | 2/2001 | Minh | G06F 17/30887 707/E17.115 |
| 6,408,316 | B1 * | 6/2002 | Himmel | G06F 17/30884 707/999.01 |
| 6,535,912 | B1 * | 3/2003 | Anupam | G06F 17/30884 707/E17.114 |
| 6,658,402 | B1 * | 12/2003 | Dutta | G06F 17/30855 |
| 7,783,979 | B1 * | 8/2010 | Leblang | G06F 17/30887 709/203 |
| 7,827,166 | B2 * | 11/2010 | Garg | G06F 17/30864 707/709 |
| 7,853,875 | B2 * | 12/2010 | Cohen | G06F 9/451 715/273 |
| 7,899,829 | B1 * | 3/2011 | Malla | G06F 16/9562 707/741 |
| 8,181,102 | B2 * | 5/2012 | Schroeder | G06F 16/9562 715/206 |
| 8,402,375 | B1 * | 3/2013 | Skare | G06F 16/9562 715/738 |
| 8,533,199 | B2 * | 9/2013 | Malla | G06F 17/241 707/741 |
| 2002/0116411 | A1 * | 8/2002 | Peters et al. | 707/501.1 |
| 2002/0116525 | A1 * | 8/2002 | Peters | G06F 16/9562 709/242 |

(Continued)

*Primary Examiner* — Maikhanh Nguyen
(74) *Attorney, Agent, or Firm* — Morgan, Lewis & Bockius LLP (57) ABSTRACT

Bookmarked web pages in a web browser are retrieved. A user selection of a bookmark is received. The bookmark is associated with a web page and a bookmarked URL having one or more path elements in a hierarchy for the web page. A determination is made that the web page is not located at the bookmarked URL. A modified URL is generated by deleting one or more path elements of the bookmarked URL according to the hierarchy. A second web page is retrieved at the modified URL. When a user has navigated to a third web page, the content of the third web page is compared to a stored version of the content of the first webpage to determine correspondence between the two web pages. The selected bookmark is updated to be associated with the URL of the third web page.

23 Claims, 7 Drawing Sheets

(56) References Cited

U.S. PATENT DOCUMENTS

| | | | | |
|---|---|---|---|---|
| 2002/0129164 | A1* | 9/2002 | Van Der Meulen | G06F 17/30887 709/239 |
| 2003/0005041 | A1* | 1/2003 | Ullmann | G06F 16/957 709/203 |
| 2003/0144984 | A1* | 7/2003 | Dunbar | G06F 16/9562 |
| 2006/0253463 | A1* | 11/2006 | Wu | G06F 17/30884 |
| 2007/0073704 | A1* | 3/2007 | Bowden | G06F 17/30867 |
| 2008/0091685 | A1* | 4/2008 | Garg | G06F 17/30864 |
| 2009/0112821 | A1* | 4/2009 | Collet et al. | 707/3 |
| 2009/0307221 | A1* | 12/2009 | Ferri et al. | 707/6 |
| 2012/0216102 | A1* | 8/2012 | Malla | G06F 17/241 715/206 |

\* cited by examiner

INTELLIGENT BOOKMARKING WITH URL MODIFICATION

BACKGROUND

The Internet provides access to a wide range of resources. For example, web pages for particular subjects are accessible over the Internet. These resources may be retrieved and viewed by users by typing in an identifier (e.g., a uniform resource locator or URL) or by clicking a link for the location of the resource. These identifiers may change, and users may be unable to reach a desired resource if the desired resource is no longer located at the location specified by the identifier.

BRIEF SUMMARY

Embodiments described below include methods, systems, and computer program products for retrieving bookmarked web pages in a web browser. A computer-implemented method in accordance with an embodiment includes receiving a user selection of a bookmark. The bookmark is associated with a first web page and a bookmarked URL. The URL includes one or more path elements in a hierarchy for the first web page. A determination is made that the first web page is not located at the bookmarked URL. A modified URL is generated by deleting one or more of the path elements of the bookmarked URL, according to the hierarchy. A second web page located at the modified URL is retrieved.

A system, in accordance with an embodiment, includes a processor. The system also includes a web browser, implemented on the processor. The web browser is configured to receive a user selection of a bookmark. The bookmark is associated with a first web page and a bookmarked URL, including one or more path elements in a hierarchy for the first web page. The web browser is configured to determine that the first web page is not located at the bookmarked URL. The web browser is further configured to generate a modified URL by deleting one or more of the path elements of the bookmarked URL, according to the hierarchy. The web browser is further configured to retrieve a second web page located at the modified URL.

A computer readable medium in accordance with an embodiment has instructions stored thereon that, when executed by a processor, cause the processor to perform operations including receiving a user selection of a bookmark. The bookmark is associated with a first web page and a bookmarked URL. The URL includes one or more path elements in a hierarchy for the first web page. The operations further include determining that the first web page is not located at the bookmarked URL. The operations also include generating a modified URL by deleting one or more of the path elements of the bookmarked URL, according to the hierarchy. The operations also include retrieving a second web page located at the modified URL.

Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

Most, if not all, modern web browsers allow users to bookmark resources, such as web pages. Users of web browsers often bookmark web pages they visit for various reasons. For example, a user may bookmark a web page that she visits daily, so that she need not type in the URL or web address of the bookmark every day. The user may also bookmark a web page she wishes to visit at some point in the future. As referred to herein, a web page may be part of a web site. A web site may include one or more web pages.

Figure 1:
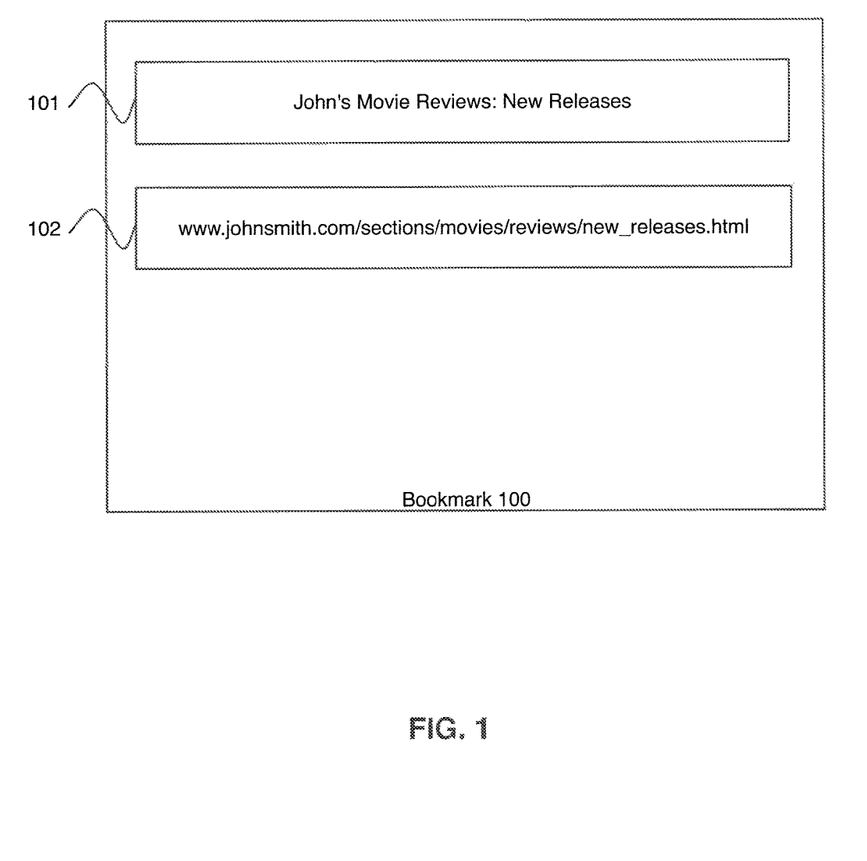
FIG. 1 is a diagram of a bookmark in accordance with an embodiment.

FIG. 1 is a diagram of an example bookmark 100 for a web page. Bookmark 100 includes title 101 and URL 102. In the example of bookmark 100, title 101 is "John's Movie Reviews: New Releases". URL 102 of bookmark 100 is "www.johnsmith.com/sections/movies/reviews/new_releases.html". Bookmark 100 may be created by a web browser in response to a user selecting an "Add Bookmark" option, or other option, in a web browser, upon visiting the web page located at URL 102. Further, bookmark 100 may be created manually by a user of the web browser by typing in a title 101 and URL 102 of the bookmark. A user may have multiple bookmarks stored by a particular web browser. Bookmarks may also be stored by an online bookmarking service and accessed via a network, such as the Internet.

As seen in bookmark 100, URL 102 includes multiple strings of text between forward slash characters ("/"). Each string of text may be known as a path element. Path elements of a URL for a web page, similar to path elements of a file name, determine where on a web site a web page may be found. The location on the web site may correspond to the web page's location on a web server hosting the web site.

URL 102 may be represented as a hierarchy. Each path element of a URL may indicate a level of a hierarchy for that particular path element. In the example of bookmark 100, in a hierarchical representation, the "movies" path element of URL 102 would be below the "sections" path element, which is in turn below the "www.johnsmith.com" path element. The domain name of the web site, or the "www.johnsmith.com" path element, may referred to as the root path element. Path elements may represent folders containing one or more web pages, or may represent individual web pages.

Figure 2A:
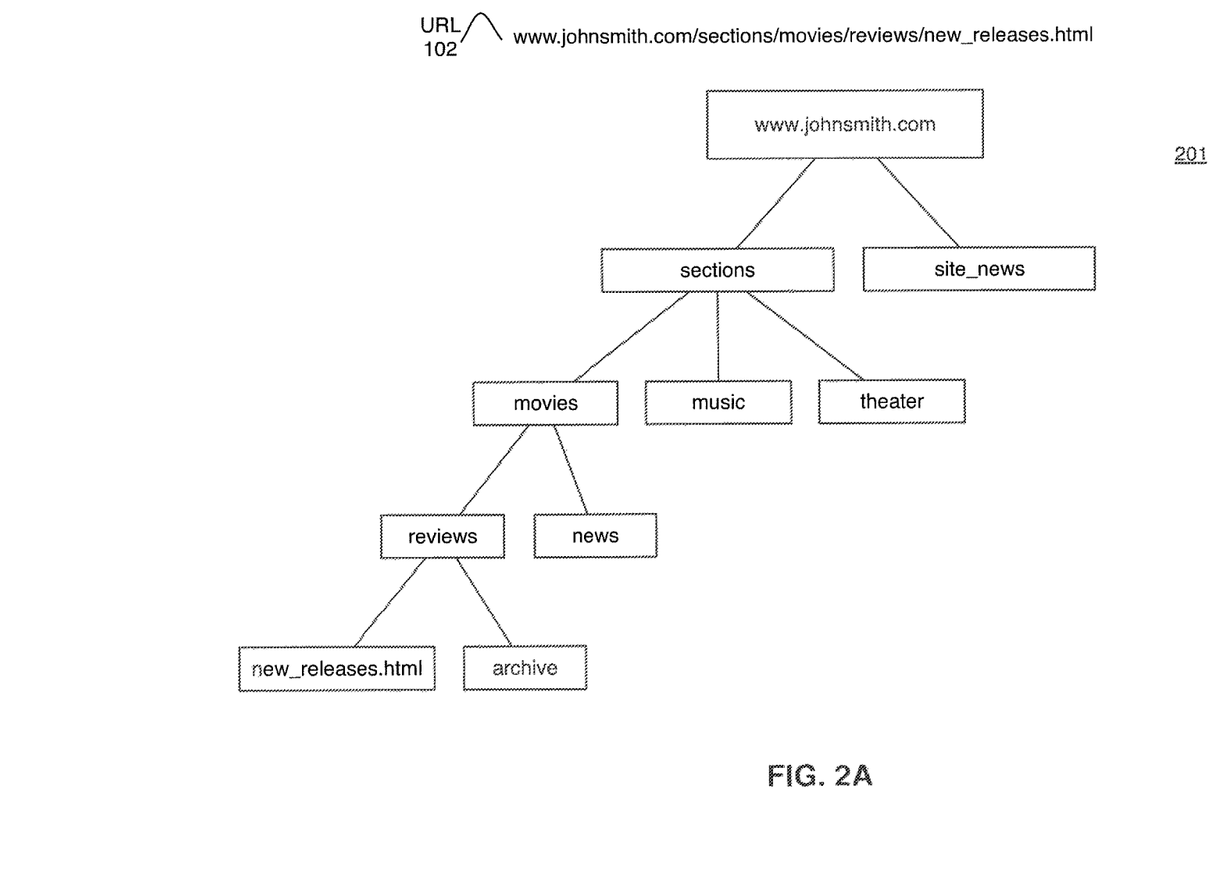
FIG. 2A is a diagram of a Uniform Resource Locator hierarchy.

A hierarchical representation of URL 102 is displayed in FIG. 2A. The top of the hierarchy 201, or the root element, may be the domain name of the web site, "www.johnsmith.com", Beneath the root element there may be two folders, "sections" and "site_news". Beneath the "sections" path element or folder, there may be three folders, "movies", "music" and "theater". The "movies" folder has two folders beneath it, "reviews" and "news". Finally, beneath the "reviews" folder, the "new_releases.html" web page and the "archive" folder may be found. Accordingly, the structure of URL 102 can be represented by hierarchy 201.

Web masters and other parties who create and manage websites may modify or reorganize the structure of the hierarchy of the webpage. For example, the creator of the John's Movie Reviews web site may decide at some point to slightly modify the hierarchy of the website from hierarchy 201 of FIG. 2A to, for example, hierarchy 211 of FIG. 2B. In hierarchy 211, the "reviews" folder has been eliminated, and the "new_releases.html" page may be found at URL 213 "www.johnsmith.com/sections/movies/new_releases.html" instead of the bookmarked URL 102.

Figure 2B:
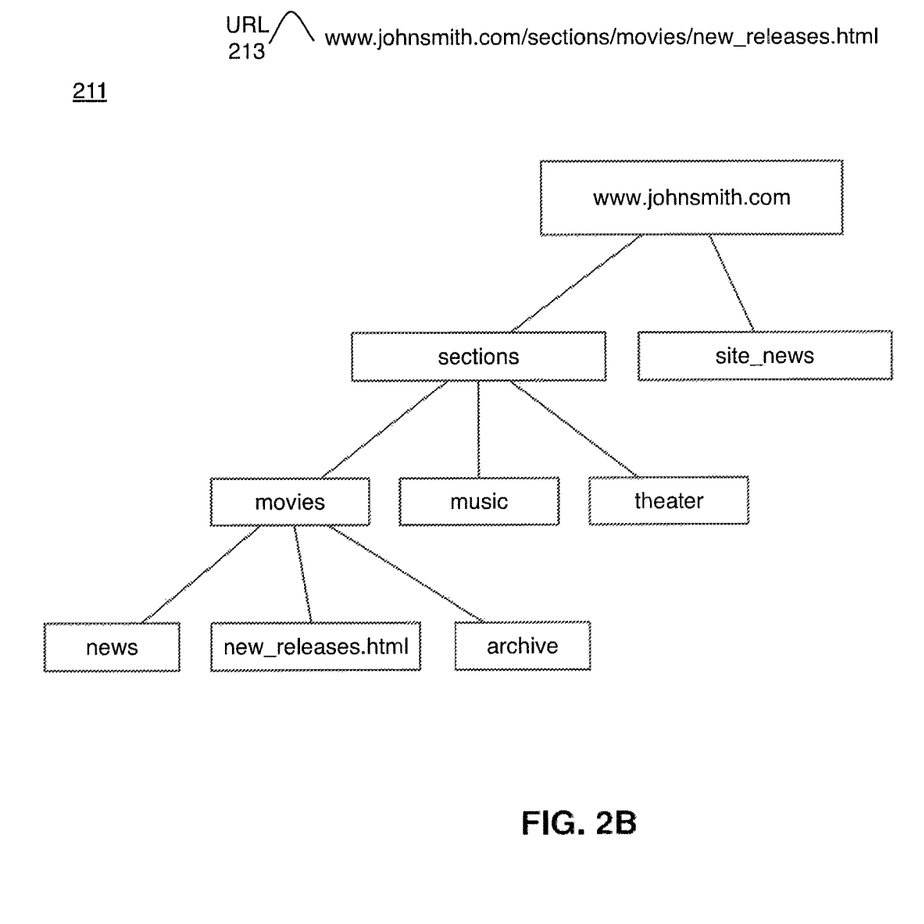
FIG. 2B is a diagram of a Uniform Resource Locator hierarchy.
Figure 2C:
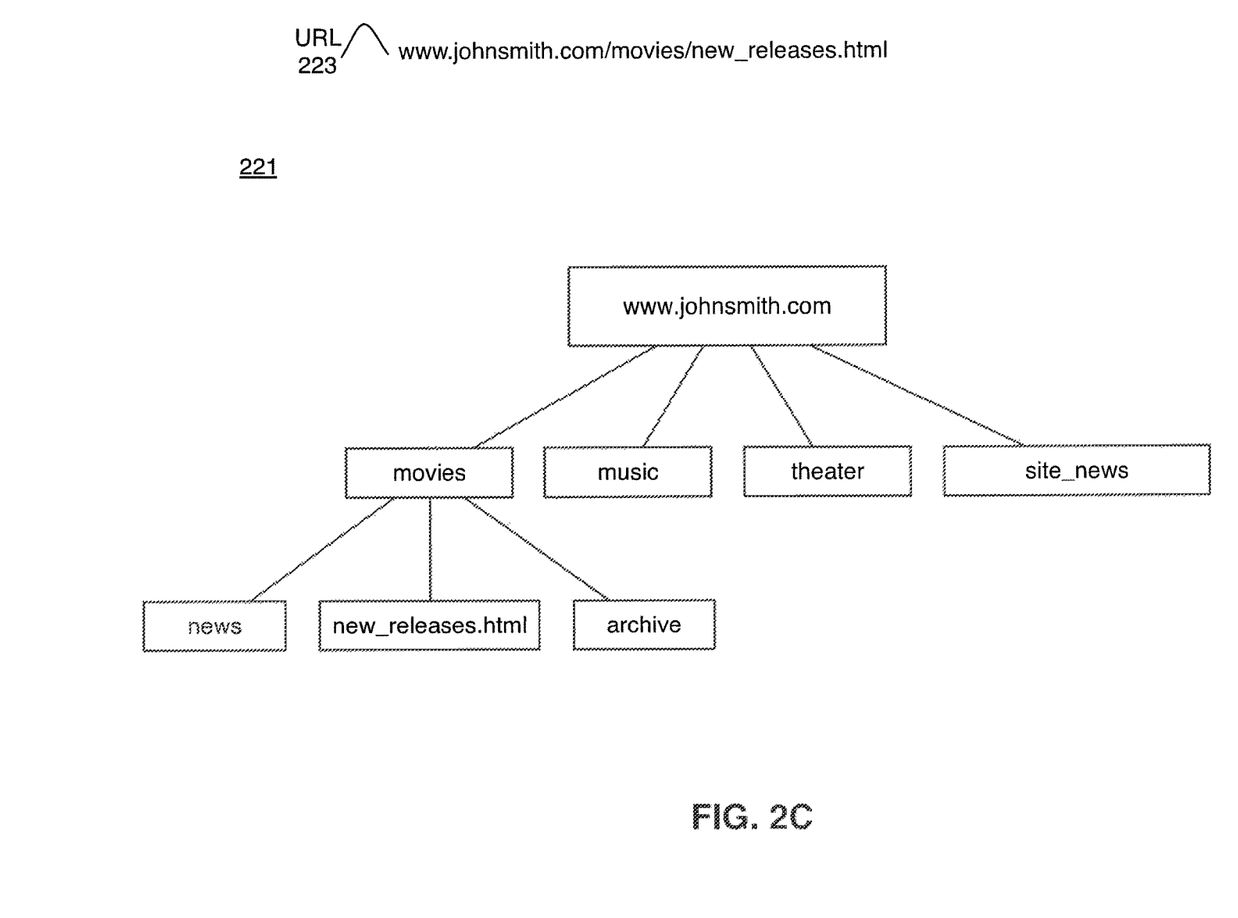
FIG. 2C is a diagram of a Uniform Resource Locator hierarchy.

Similarly, the creator of the John's Movie Reviews web site may drastically reorganize the hierarchy of the website from hierarchy 201 of FIG. 2A to hierarchy 221 of FIG. 2C. In hierarchy 205, the "sections" and "reviews" folders have been eliminated, and the "new_releases.html" page may be found at URL 223, "www.johnsmith.com/movies/new_releases.html".

A web master or other party controlling a web site may modify the hierarchy of the web site (and correspondingly, the individual URLs of web pages) at any time for various reasons. For example, a web master may modify a hierarchy of a web site on the belief that shorter URLs are easier for users to remember. However, users who have bookmarked a particular web page, upon selecting the bookmark, may be presented with an error page if the hierarchy has been modified between the time when the user bookmarked the web page and when the user desires to view the web page at a later time. For example, a web browser may receive an HTTP 404 status code, and display an error page, if no web page can be found at the bookmarked URL.

Although the hierarchy of a web site may be modified, in most cases, the web site will not have a different domain name. Further, the desired web page may likely exist, albeit with a slightly different URL. A user may be able to find the desired web page if she is directed to other areas of the web site. Further, although the user may not initially reach the desired web page, she may find it beneficial to view related web pages which are part of the same web site. Thus, some embodiments disclosed herein may assist a user in locating web pages related to her desired bookmarked web page, which may in turn allow a user to find her desired web page.

Figure 3:
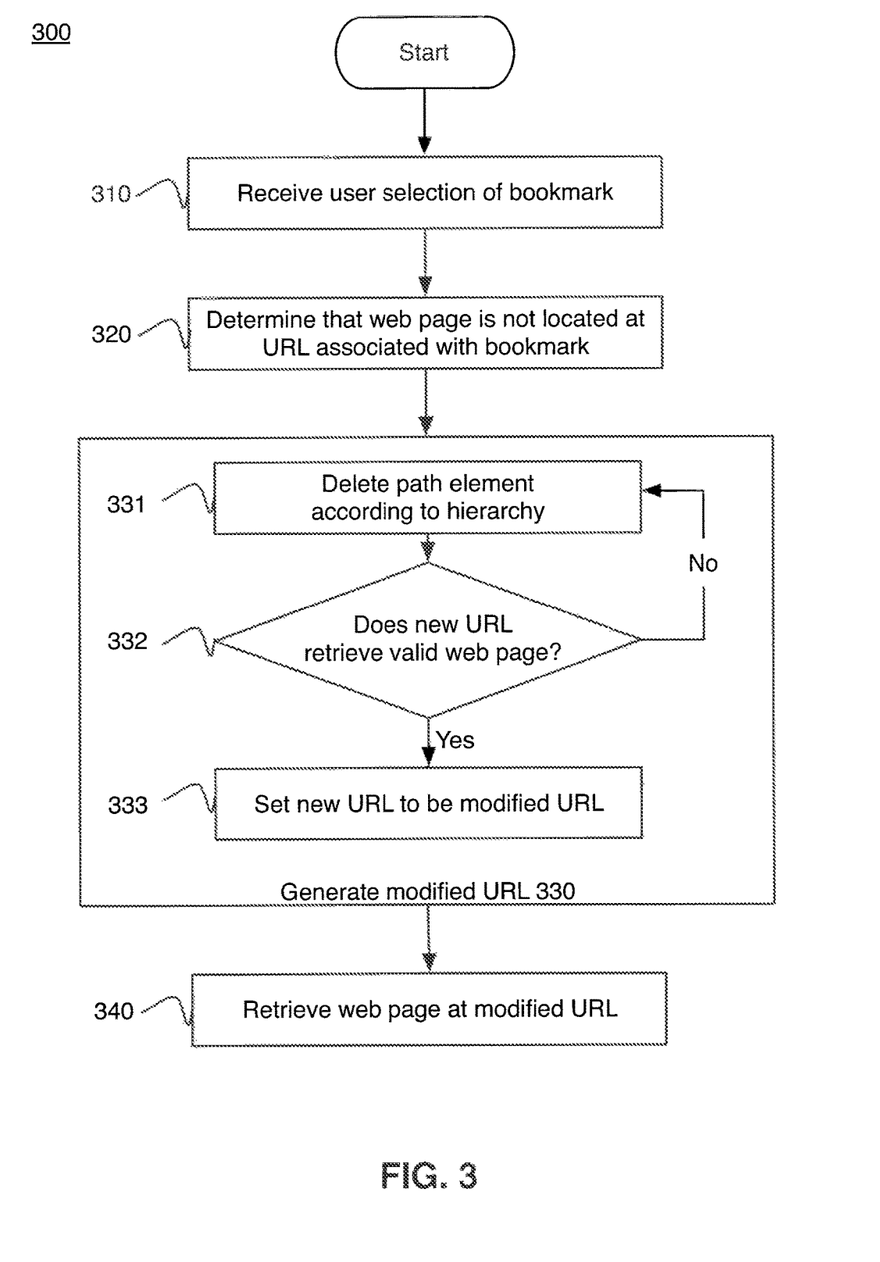
FIG. 3 is a flow diagram of a method in accordance with an embodiment.

FIG. 3 is a flow diagram of a method 300 in accordance with an embodiment. Method 300 may be performed, in one embodiment, by a web browser executing on a computing device.

At block 310 of method 300, a user selection of a bookmark is received. For example, a user may select a bookmark from a bookmarks bar area of a web browser, or from a bookmarks menu or manager of a web browser. The bookmark is associated with a web page and a bookmarked URL. The bookmarked URL may include one or more path elements in a hierarchy for the web page.

At block 320 of method 300, a determination is made that the web page associated with the bookmark is not located at the URL associated with the bookmark. In one embodiment, the determination may be made by a web browser upon receiving an HTTP 404 status code from a web server. In another embodiment, the determination may be made by a web browser if the request for the web page "times out" or does not retrieve the web page after a pre-defined period of time after the transmission of the request. In one embodiment, a notification may be displayed to a user indicating that the web page is not available.

At block 330, a modified URL is generated. Block 330 includes sub-block 331, decision block 332, and sub-block 333. At sub-block 331 of block 330, a temporary URL is generated by deleting a path element from the URL associated with the bookmark, according to the hierarchy. At decision block 332, the temporary URL is tested to determine whether it retrieves a valid web page. For example, a web browser may try to retrieve a web page located at the temporary URL. If no web page exists at the temporary URL, block 330 returns to sub-block 331. If block 331 is repeated, another path element may be deleted from the temporary URL to create a further temporary URL, which may then be tested in accordance with decision block 332.

If, at decision block 332, the temporary URL retrieves a valid web page, the temporary URL is set as the modified URL in sub-block 333. Method 300 may then proceed to block 340.

At block 340, the web page at the modified URL is retrieved. In one embodiment, a notification may be displayed to the user indicating that the web page at the original URL was unavailable, but that a related web page is displayed.

Method 300 may be further explained using the examples of bookmark 100 and hierarchies 201, 211, and 221. As explained above, URL 102 of bookmark 100 may be represented by hierarchy 201 of FIG. 2A. At some point, the web master of "www.johnsmith.com" may restructure or otherwise modify the hierarchy of the web site to hierarchy 211 of FIG. 2B. The "new_reviews.html" web page may be located at URL 213.

After the hierarchy is changed, a user may select bookmark 100. A web browser may receive the selection of bookmark 100 in accordance with block 310, and determine that the desired web page is not located at URL 102, in accordance with block 320. In accordance with block 330 and sub-block 331 then, a path element may be deleted from the hierarchy. In the example of bookmark 100, the "new_releases.html" path element may be deleted to generate a temporary URL. At decision block 332, a determination may be made that the temporary URL does not retrieve a valid web page. Thus, a further path element, "reviews", may be deleted. As seen in hierarchy 211, the resulting URL, "www.johnsmith.com/sections/movies/" is a valid web page. Thus, the resulting URL may be set to be the modified URL, in accordance with sub-block 333. The web page located at the modified URL may then be retrieved in accordance with block 340.

In a second example, the hierarchy of "www.johnsmith.com" may be modified from hierarchy 201 to hierarchy 221. After the hierarchy is changed, a user may select bookmark 100. As hierarchy 221 and URL 223 are significantly different than hierarchy 201 and URL 102, path elements may be deleted from URL 102, in accordance with method 300, until the modified URL is set to "www.johnsmith.com", or the root of the hierarchy.

In one embodiment, after the web page is retrieved at the modified URL, the bookmark may be updated to be associated with the modified URL. In a further embodiment, a user may be provided an option to update the bookmark to be associated with the modified URL, prior to the bookmark being updated to be associated with the modified URL.

In some situations, when the user is presented with the web page located at the modified URL, she may continue navigating the web site to locate her desired web page. In the example of hierarchy 211 and URL 213 above, the user may navigate from "www.johnsmith.com/sections/movies" to the "new_releases.html" web page, via a link to the "new_releases.html" web page. In one embodiment, a determination may be made that the user has navigated to another web page different from the web page retrieved at the modified URL. The web page the user navigates to may be identified as corresponding to the initial web page associated with the bookmark. Based on the identification, the bookmark may be updated to be associated with a URL for the web page the user navigated to.

In one embodiment, the identification may be made based on the content of the web page to which the user has navigated. For example, the content of the web page to which the user has navigated may be compared to a stored or cached version of the web page at the bookmarked URL. If the content of the web pages match, the web pages may be identified as corresponding. The bookmark may be updated with the URL of the web page the user navigated to, based on the identification. In one embodiment, the comparison may be based on the amount of content that matches between the content of the stored version of the web page and the content of the web page the user has navigated to. If the amount of content or percentage of content that matches satisfies a threshold, the two web pages may be identified as corresponding to each other.

In a further embodiment, the identification may be made based on the URL associated with the web page to which the user has navigated. For example, URL 102, originally associated with bookmark 100, is "www.johnsmith.com/sections/movies/reviews/new_releases.html". The user may be directed to another web page and may navigate to the page located "www.johnsmith.com/sections/movies/new_releases.html". The two URLs may be compared. Based on the comparison, the web page the user has navigated to may be identified as corresponding to the originally bookmarked page, and the bookmark may be updated with the URL, based on the identification. In this example, because the final path element of the web page URL ("new_releases.html") matches, and three other path elements are identical, the two URLs may be identified as corresponding to each other. In yet a farther embodiment, the identification may be based on comparing the title of the bookmark with the title of the web page where the user has navigated to.

Redirecting users to similar web pages as described herein may improve a user's experience. For example, if a user does not know that a web site has changed its hierarchy or URL structure, she may be unable to access her desired content. In some embodiments, web pages located at modified URLs are provided with minimal user involvement. In one embodiment, a user may specify an option to always generate modified URLs when a web browser cannot retrieve a web page at a URL associated with a bookmark. In a further embodiment, the user may be presented with an option to select whether the web browser should generate a modified URL when the web browser cannot retrieve a web page at a bookmarked URL.

Figure 4:
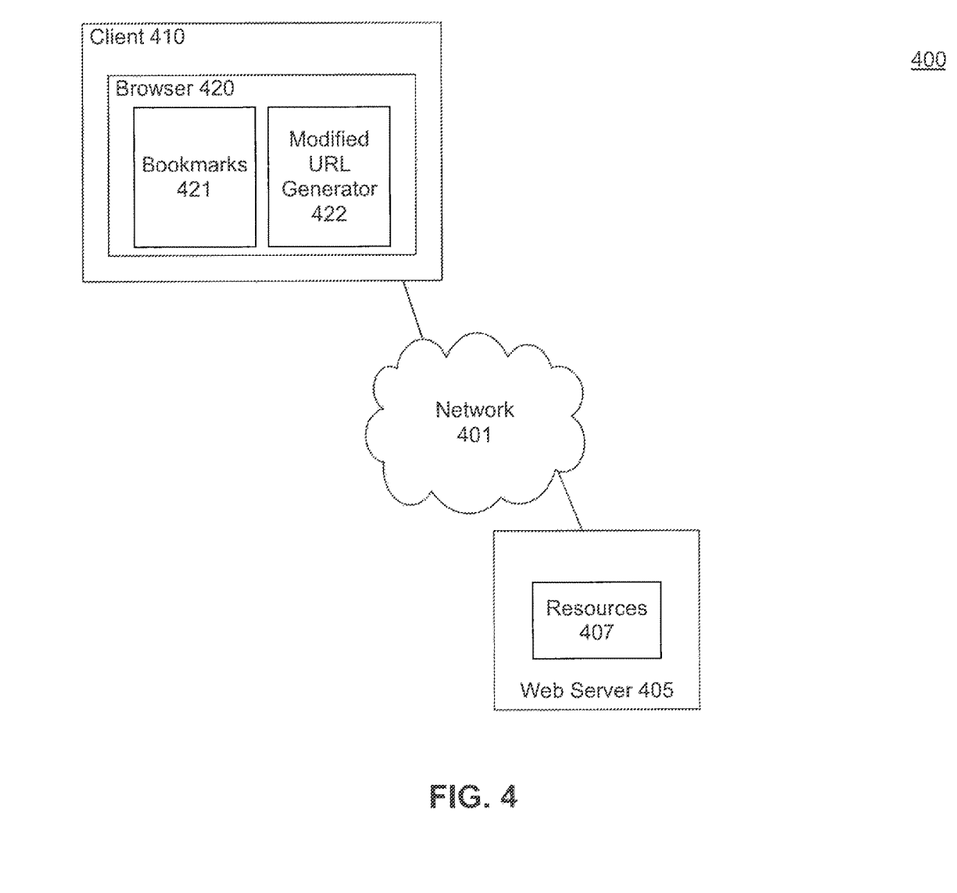
FIG. 4 is a diagram of a system in accordance with an embodiment.

FIG. 4 is an illustration of an example environment 400 in which embodiments may be implemented. Environment 400 includes client 410 and web server 405. The systems of environment 400 are connected via network 401, which may be a local area network or wide area network such as the Internet. Connections between the various systems of environment 400 and network 401 may be wired or wireless connections.

Client 410 may be, for example and without limitation, a device such as a desktop computer, laptop computer, mobile device, tablet computer, set top box, or other computing device configured to access resources through, a network. Client 410 includes browser 420, which may be an application executed by a processing device of client 410. Browser 420 is configured to request and retrieve resources, such as web pages or web sites, over network 401. Browser 420 includes bookmarks 421, which may be input by a user and stored on client 410, or accessed via network 401. Each bookmark may include a descriptive title and a link to a URL, as described herein with reference to bookmark 100. Browser 420 further includes modified URL generator 422, which may generate modified URLs in accordance with method 300 of FIG. 3.

Web server 405 may be any computing device configured to accept requests for resources 407, such as web pages, and provide resources in response to the requests. Web server 405 may be implemented on a computing device or a group of computing devices. Further, web server 405 may be implemented on a distributed computing system.

Figure 5:
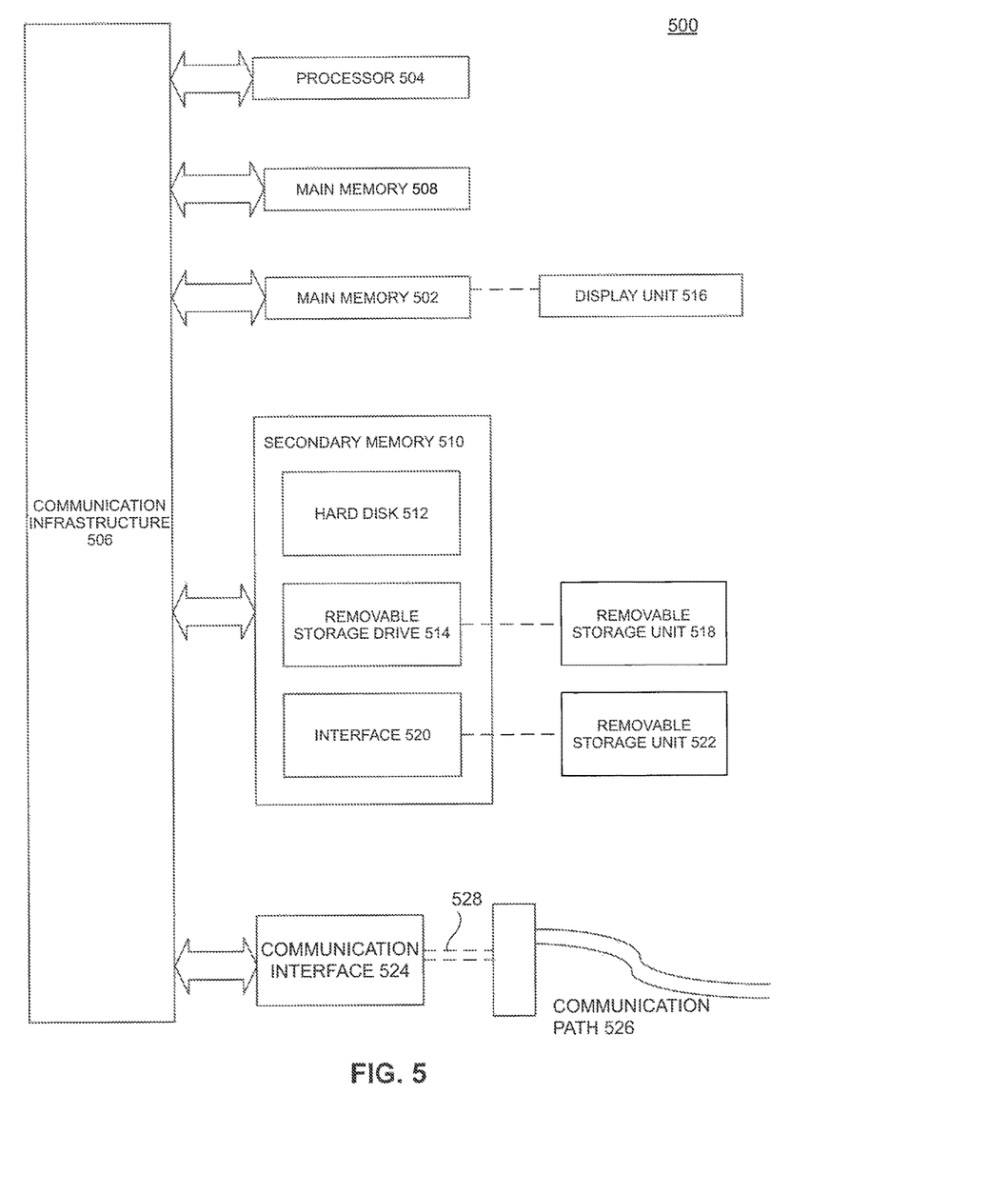
FIG. 5 is a diagram of a system that can be used to implement embodiments described herein.

FIG. 5 illustrates an example computer system 500 in which some embodiments, or portions thereof, may be implemented. For example, web browser 420 executing on client device 410 may be implemented in computer system 500 using hardware, software, firmware, tangible computer readable media having instructions stored thereon, or a combination thereof and may be implemented in one or more computer systems or other processing systems.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 500. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 504 may be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may include a floppy disk drive, a magnetic tape drive, an optical disk drive, a flash memory, or the like. The removable storage drive 514 reads from and/or writes to a removable storage unit 518 in a well-known manner. Removable storage unit 518 may include a floppy disk, magnetic tape, optical disk, etc. which is read by and written to by removable storage drive 514. As will be appreciated by persons skilled in the relevant art, removable storage unit 518 includes a computer-readable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interlace (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer-readable medium" are used to generally refer to media such as removable storage unit 518, removable storage unit 522, and a hard disk installed in hard disk drive 512. Computer program medium and computer-readable medium may also refer to memories, such as main memory 508 and secondary memory 510, which may be memory semiconductors (e.g. DRAMs, etc.).

Embodiments also may be directed to computer program products comprising software stored on any computer-readable medium. Such software, when executed in one or more data processing device, causes a data processing device(s) to operate as described herein. Embodiments employ any computer useable or readable medium. Examples of tangible computer-readable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A computer-implemented method comprising:
   receiving, by a processor, a user selection of a bookmark, wherein the bookmark is associated with a first web page and a bookmarked Uniform Resource Locator (URL);
   determining that the first web page is not located at the bookmarked URL;
   generating a modified URL from the bookmarked URL;
   retrieving a second web page located at the modified URL;
   receiving input from a user of a web browser to navigate to a third web page from the retrieved second web page, wherein a URL of the third web page is not a sub-path of the modified URL of the second web page; and
   responsive to receiving the input from the user of the web browser to navigate to the third web page from the retrieved second web page,
   automatically updating the bookmark to be associated with the URL of the third web page input by the user that is not the sub-path of the modified URL of the second web page when the third web page is identified as corresponding to the first web page.

2. The method of claim 1, further comprising:
   updating the bookmark to be associated with the modified URL.

3. The method of claim 1, further comprising:
   providing an option to update the bookmark to be associated with the modified URL; and
   updating the bookmark to be associated with the modified URL in response to the user selecting the option.

4. The method of claim 1, further comprising:
   comparing the URL associated with the third web page to the bookmarked URL; and
   identifying the third web page as corresponding to the first web page, further based on the comparing of the URL.

5. The computer implemented method of claim 4, wherein the comparing and the identifying are performed by the web browser.

6. The method of claim 1, further comprising:
   displaying a notification to the user indicating that the first web page is unavailable.

7. The method of claim 1, wherein determining that the first web page is not located at the bookmarked URL further comprises:
   receiving an HTTP 404 status code from a web server associated with the bookmarked URL.

8. The method of claim 1, wherein the generating the modified URL comprises generating the modified URL by deleting one or more intermediate path elements of the bookmarked URL according to a hierarchy of one or more path elements for the first web page.

9. The computer implemented method of claim 1, wherein the determining that the user of the web browser has navigated to the third web page further comprises:
   determining that the user of the web browser has navigated to the third web page via a link in the second web page.

10. A system, comprising:
   a processor; and
   a web browser, implemented on the processor, configured to:
      receive a user selection of a bookmark, wherein the bookmark is associated with a first web page and a bookmarked Uniform Resource Locator (URL);
      determine that the first web page is not located at the bookmarked URL;
      generate a modified URL from the bookmarked URL;
      retrieve a second web page located at the modified URL;
      receive input from a user of the web browser to navigate to a third web page from the retrieved second web page; and
      responsive to receipt of the input from the user of the web browser to navigate to the third web page from the retrieved second web page:
         compare content of the third web page to a stored version of content of the first web page;
         identify the third web page as corresponding to the first web page, based on the compare; and
         update the bookmark to be associated with the URL associated with the third web page when the third web page corresponding to the received input from the user is identified as corresponding to the first web page.

11. The system of claim 10, wherein the web browser is further configured to update the bookmark to be associated with the modified URL.

12. The system of claim 10, wherein the web browser is further configured to:
   provide an option to update the bookmark to be associated with the modified URL; and
   update the bookmark to be associated with the modified URL in response to the user selecting the option.

13. The system of claim 10, wherein the web browser is further configured to:
   compare the URL of the third web page to the bookmarked URL; and
   identify the third web page as corresponding to the first web page, further based on comparing the URL of the third web page to the bookmarked URL.

14. The system of claim 10, wherein the web browser is further configured to display a notification to the user indicating that the first web page is unavailable.

15. The system of claim 10, wherein the web browser is further configured to determine that the first web page is not located at the bookmarked URL by:
   receiving an HTTP 404 status code from a web server associated with the bookmarked URL.

16. The system of claim 10, wherein the web browser is further configured to generate the modified URL by deleting one or more intermediate path elements of the bookmarked URL according to a hierarchy of one or more path elements for the first web page.

17. A non-transitory computer readable storage medium having instructions stored thereon that, when executed by a processor, cause the processor to perform operations including:
   receiving a user selection of a bookmark, wherein the bookmark is associated with a first web page and a bookmarked Uniform Resource Locator (URL);
   determining that the first web page is not located at the bookmarked URL;
   generating a modified URL from the bookmarked URL;
   retrieving a second web page located at the modified URL;
   receiving a user selection of a link corresponding to a third web page subsequent to presenting the retrieved second web page to a user;
   responsive to receiving the user selection of the link corresponding to the third web page subsequent to presenting the retrieved second web page to the user:
   comparing content of the third web page to a stored version of content of the first web page;
   identifying the third web page as corresponding to the first web page when the comparing indicates a content match satisfies a threshold; and
   updating the bookmark to be associated with a URL associated with the third web page when the third web page is identified as corresponding to the first web page.

18. The computer readable storage medium of claim 17, the operations further comprising:
   updating the bookmark to be associated with the modified URL.

19. The computer readable storage medium of claim 17, the operations further comprising:
   providing an option to update the bookmark to be associated with the modified URL; and
   updating the bookmark to be associated with the modified URL in response to the user selecting the option.

20. The computer readable storage medium of claim 17, the operations further comprising:
   comparing the URL associated with the third web page to the bookmarked URL; and
   identifying the third web page as corresponding to the first web page, further based on the comparing of the URL.

21. The computer readable storage medium of claim 17, the operations further comprising:
   outputting for display a notification to the user indicating that the first web page is unavailable.

22. The computer readable storage medium of claim 17, wherein determining that the first web page is not located at the bookmarked URL further comprises:
   receiving an HTTP 404 status code from a web server associated with the bookmarked URL.

23. The computer readable storage medium of claim 17, wherein the generating comprises generating the modified URL by deleting one or more intermediate path elements of the bookmarked URL according to a hierarchy of one or more path elements for the first web page.

* * * * *